(12) United States Patent
Eng et al.

(10) Patent No.: US 10,518,371 B2
(45) Date of Patent: Dec. 31, 2019

(54) COLLAR FASTENING SYSTEM AND METHOD OF OPERATING

(71) Applicant: The Boeing Company, Chicago, IL (US)

(72) Inventors: Raymond Eng, Seattle, WA (US); John Richard Porter, Edgewood, WA (US); Daniel Thomas Long, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 673 days.

(21) Appl. No.: 15/191,728

(22) Filed: Jun. 24, 2016

(65) Prior Publication Data

US 2017/0368650 A1  Dec. 28, 2017

(51) Int. Cl.
 *B23P 19/00* (2006.01)
 *B23P 19/08* (2006.01)
 *B25J 15/06* (2006.01)

(52) U.S. Cl.
 CPC ........... *B23P 19/08* (2013.01); *B25J 15/0616* (2013.01)

(58) Field of Classification Search
 CPC . B23P 19/08; B23P 23/00; B23Q 1/00; B23Q 1/25; B23Q 1/28; B23Q 3/00; B25J 15/0616; B25B 11/00
 See application file for complete search history.

(56) References Cited

U.S. PATENT DOCUMENTS

| 3,583,451 | A | * | 6/1971 | Dixon | B23P 19/006 29/240 |
| 5,761,785 | A | * | 6/1998 | Connolly | B23P 19/045 269/21 |
| 2015/0082605 | A1 | * | 3/2015 | Batt | B21D 39/00 29/505 |
| 2017/0368650 | A1 | * | 12/2017 | Eng | B23P 19/08 |

OTHER PUBLICATIONS

Co-pending U.S. Appl. No. 14/819,669, filed Aug. 6, 2015; 15 pp.
Co-pending U.S. Appl. No. 14/839,116, filed Aug. 28, 2015; 40 pp.

\* cited by examiner

*Primary Examiner* — Lee D Wilson
(74) *Attorney, Agent, or Firm* — Armstrong Teasdale LLP (57) ABSTRACT

A collar fastening system that includes a collar fastening tool, and a collar loading assembly coupled to the collar fastening tool. The collar loading assembly includes a loading arm that rotates into multiple positions and a holding member coupled to the loading arm. The loading arm positions the holding member between a loading position and an unloading position. The holding member includes an arcuate side wall and a vacuum opening defined in the arcuate side wall. The holding member receives a collar when at the loading position, and selectively holds the collar against the arcuate side wall with a retaining force provided by a vacuum applied via the vacuum opening. The loading arm provides the collar to the collar fastening tool when at the unloading position.

20 Claims, 8 Drawing Sheets

COLLAR FASTENING SYSTEM AND METHOD OF OPERATING

BACKGROUND

The field of the present disclosure relates generally to a robotic device and, more specifically, to a compact robotic end effector having a collar fastening tool and a collar loading assembly for providing individual collars to the collar fastening tool.

In manufacturing, swaging or swedging are terms that generally refer a process for affixing a collar to a threaded fastener with an interference fit. For example, a fastening tool receives the collar, is aligned with the threaded fastener, and forces the collar onto the threaded fastener. In at least some known manufacturing settings, swaging or swedging processes are undertaken with the use of automated or robotic assemblies. The use of robotic assemblies facilitates precise and efficient installation of collars onto threaded fasteners. However, it may be difficult to deliver additional collars to the fastening tool after each installation step, especially when the fastening tool is inserted within a tightly confined space or structure.

BRIEF DESCRIPTION

In one aspect, a collar fastening system is provided. The system includes a collar fastening tool, and a collar loading assembly coupled to the collar fastening tool. The collar loading assembly includes a loading arm configured to rotate into a plurality of positions and a holding member coupled to the loading arm. The loading arm is configured to position the holding member between a loading position and an unloading position. The holding member includes an arcuate side wall and a vacuum opening defined in the arcuate side wall. The holding member is configured to receive a collar when at the loading position, and is configured to selectively hold the collar against the arcuate side wall with a retaining force provided by a vacuum applied via the vacuum opening. The loading arm is configured to provide the collar to the collar fastening tool when at the unloading position.

In another aspect, a robotic device is provided. The robotic device includes an end effector that includes a collar fastening tool, and a collar loading assembly coupled to the collar fastening tool. The collar loading assembly includes a loading arm configured to rotate into a plurality of positions and a holding member coupled to the loading arm. The loading arm is configured to position the holding member between a loading position and an unloading position. The holding member includes an arcuate side wall and a vacuum opening defined in the arcuate side wall. The holding member is configured to receive a collar when at the loading position, and is configured to selectively hold the collar against the arcuate side wall with a retaining force provided by a vacuum applied via the vacuum opening. The loading arm is configured to provide the collar to the collar fastening tool when at the unloading position.

In yet another aspect, a method of operating a collar fastening system including a collar fastening tool is provided. The method includes feeding a collar towards a loading zone defined within a collar capture receptacle, and positioning a holding member into a loading position within the loading zone. The holding member includes an arcuate side wall configured to receive the collar when at the loading position. The method further includes holding the collar against the arcuate side wall of the holding member with a retaining force provided by a vacuum applied via a vacuum opening defined in the arcuate side wall, and positioning the holding member from the loading position into an unloading position. The holding member is configured to provide the collar to the collar fastening tool when at the unloading position.

DETAILED DESCRIPTION

The implementations described herein relate to a compact robotic end effector having a collar fastening tool and a collar loading assembly for providing individual collars to the collar fastening tool. More specifically, the collar loading assembly includes a loading arm and a holding member that receives a single collar, holds the collar with a retaining force, and provides the collar to the collar fastening tool. The collars are stored remotely from the collar loading assembly for reducing the size and increasing the accessibility of the end effector. In addition, the collars are provided to the collar fastening tool without having to return the entire end effector to a home position. As such, the systems and methods described herein facilitate forming structures in a timely and more efficient manner.

As used herein, an element or step recited in the singular and proceeded with the word "a" or "an" should be understood as not excluding plural elements or steps, unless such exclusion is explicitly recited. Furthermore, references to "exemplary implementation" or "one implementation" of the present disclosure are not intended to be interpreted as excluding the existence of additional implementations that also incorporate the recited features.

Figure 1:
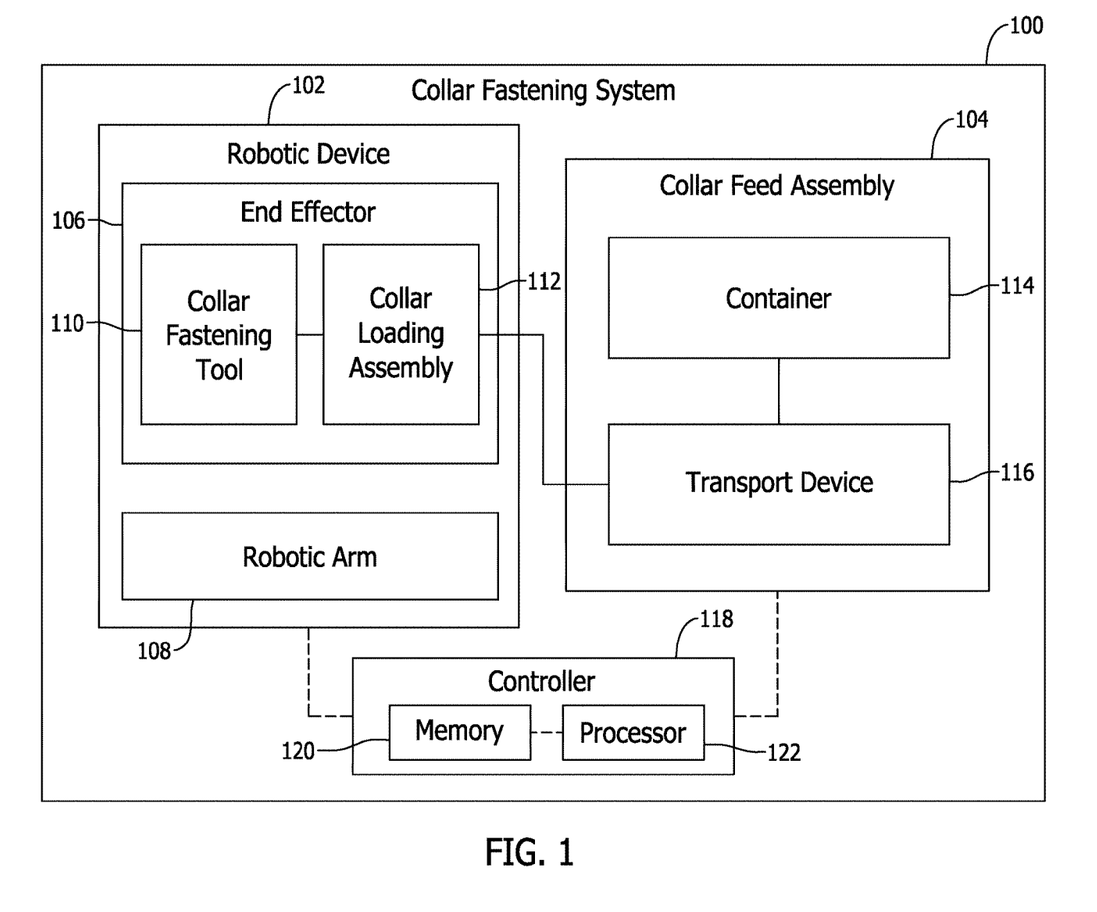
FIG. 1 is a block diagram of an exemplary collar fastening system.

FIG. 1 is a block diagram of an exemplary collar fastening system 100. In the exemplary implementation, collar fastening system 100 includes a robotic device 102 and a collar feed assembly 104. Robotic device 102 includes an end effector 106 and a robotic arm 108 coupled to end effector 106. Robotic arm 108 is operable for positioning end effector 106 in one or more installation positions when assembling a structure. End effector 106 includes a collar fastening tool 110 and a collar loading assembly 112 coupled to collar fastening tool 110. As such, collar fastening tool 110 and collar loading assembly 112 are positionable together in the one or more installation positions to facilitate quick and efficient loading of additional collars onto collar fastening tool 110 after each installation.

In the exemplary implementation, at least a portion of collar feed assembly 104 is positioned remotely from robotic device 102. Collar feed assembly 104 includes a container 114 and a transport device 116. Container 114 holds a plurality of collars (not shown) therein, and transport device 116 feeds individual collars from container 114 towards collar loading assembly 112, as will be described in more detail below. In one implementation, container 114 is embodied as a vibratory bowl feeder device.

Collar fastening system 100 also includes a controller 118 for controlling operation of collar fastening system 100.

More specifically, controller 118 is coupled, either by wired or wireless connectivity, in communication with robotic device 102 and collar feed assembly 104. Controller 118 includes a memory 120 and a processor 122, comprising hardware and software, coupled to the memory for executing programmed instructions. Processor 122 may include one or more processing units (e.g., in a multi-core configuration) and/or include a cryptographic accelerator (not shown). Controller 118 is programmable to perform one or more operations described herein by programming memory 120 and/or processor 122. For example, processor 122 may be programmed by encoding an operation as executable instructions and providing the executable instructions in the memory.

Processor 122 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by the processor, cause the processor to perform at least a portion of the functions described herein. The above examples are exemplary only, and thus are not intended to limit in any way the definition and/or meaning of the term processor.

Memory 120 is one or more devices that enable information such as executable instructions and/or other data to be stored and retrieved. The memory may include one or more computer-readable media, such as, without limitation, dynamic random access memory (DRAM), synchronous dynamic random access memory (SDRAM), static random access memory (SRAM), a solid state disk, and/or a hard disk. Memory 120 may be configured to store, without limitation, executable instructions, operating systems, applications, resources, installation scripts and/or any other type of data suitable for use with the methods and systems described herein.

Instructions for operating systems and applications are located in a functional form on non-transitory memory for execution by processor 122 to perform one or more of the processes described herein. These instructions in the different implementations may be embodied on different physical or tangible computer-readable media, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from controller 118 to permit access and/or execution by processor 122. In an alternative implementation, the computer-readable media is not removable.

Figure 2:
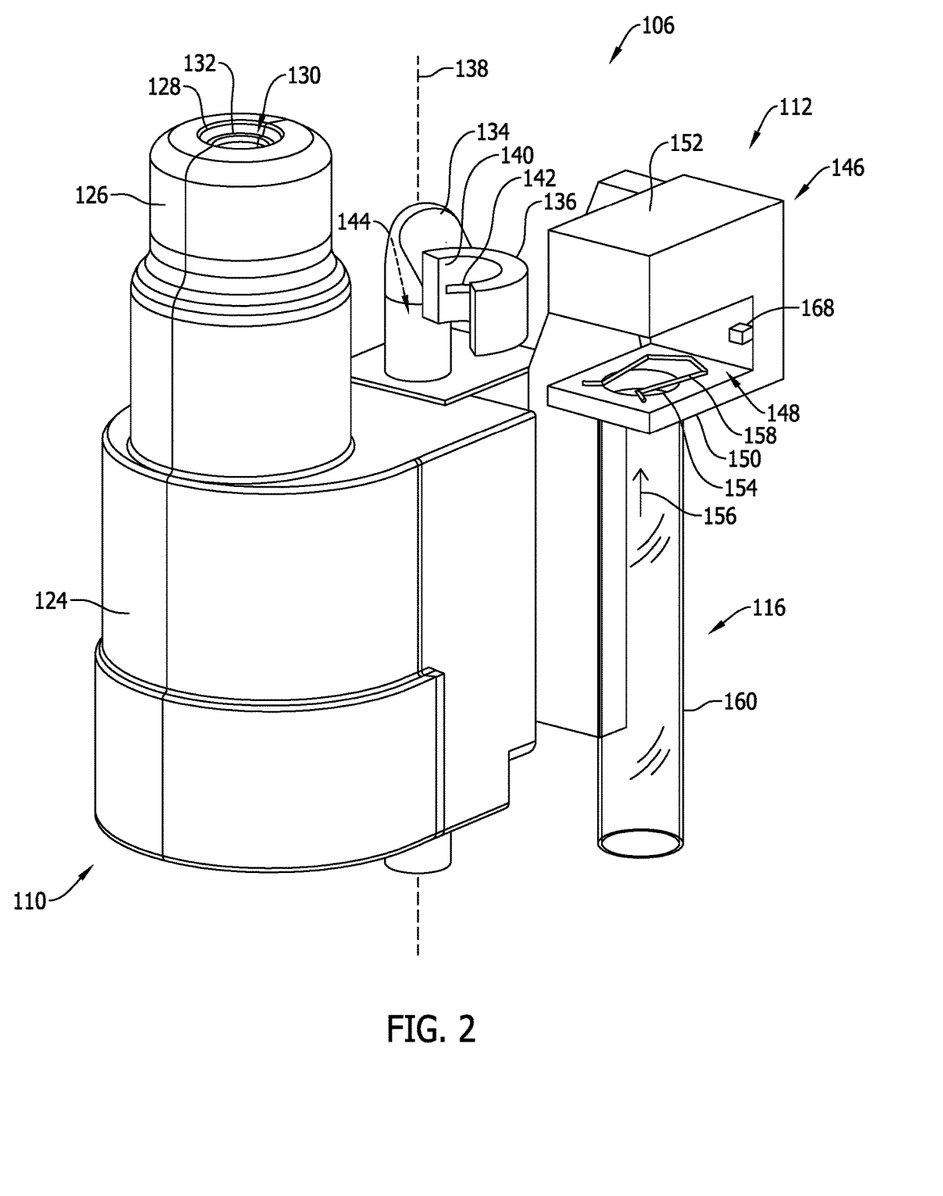
FIG. 2 is a perspective view of an exemplary end effector that may be used with the collar fastening system shown in FIG. 1.

FIG. 2 is a perspective view of end effector 106 that may be used with collar fastening system 100 (shown in FIG. 1). In the exemplary implementation, end effector 106 includes collar fastening tool 110 (i.e., a swaging device) and collar loading assembly 112 coupled to collar fastening tool 110. Collar fastening tool 110 includes a body portion 124 and a nose portion 126 extending from body portion 124. Collar loading assembly 112 is coupled to collar fastening tool 110 at body portion 124. Nose portion 126 includes a fastener opening 128 and a fastener channel 130 defined therein. Nose portion 126 also includes a stepped portion 132 within fastener channel 130. As such, during collar installation, fastener opening 128 is sized for receiving a collar (not shown) therethrough, and stepped portion 132 is sized for restricting the collar from falling within fastener channel 130. Moreover, fastener channel 130 extends within nose portion 126 and is sized such that at least a portion of a fastener is received therein when installing the collar over the fastener, as will be described in more detail below.

In the exemplary implementation, collar loading assembly 112 includes a loading arm 134 and a holding member 136 coupled to loading arm 134. As will be described in more detail below, loading arm 134 positions holding member 136 between a loading position and an unloading position. More specifically, loading arm 134 is rotatable and translatable relative to an axis 138. Holding member 136 receives a collar when at the loading position, and provides the collar to collar fastening tool 110 when at the unloading position. Moreover, holding member 136 includes a side wall 140 contoured to facilitate flush engagement with the collar when received at holding member 136. In the exemplary implementation, side wall 140 is circular or arcuately shaped.

In some implementations, holding member 136 selectively holds the collar with a retaining force when carrying the collar from the loading position to the unloading position. For example, as shown, holding member 136 includes a vacuum opening 142 defined in side wall 140. Vacuum opening 142 extends circumferentially along side wall 140 such that the retaining force is provided substantially uniformly along side wall 140. In addition, in one implementation, loading arm 134 is hollow for defining a vacuum channel 144 that extends within loading arm 134. Vacuum channel 144 couples vacuum opening 142 in flow communication with a vacuum mechanism (not shown). As such, in operation, air 145 drawn through vacuum opening 142 and vacuum channel 144, and holding member 136 selectively holds the collar against side wall 140 with a retaining force proximate side wall 140 that is formed by a vacuum applied via vacuum opening 142 that is capable of holding the collar against side wall 140 of holding member 136. In an alternative implementation, the retaining force is provided to holding member 136 via magnetism. For example, an electromagnetic device may be coupled to holding member 136, and selectively actuated based on whether holding member 136 is at the loading position or the unloading position.

Collar loading assembly 112 further includes a collar capture receptacle 146 that defines a loading zone 148 for the collar. More specifically, collar capture receptacle 146 includes a first plate 150 and a second plate 152 spaced from each other by a distance such that loading zone 148 is defined therebetween. First plate 150 includes a collar feed opening 154 defined therein. Collar feed opening 154 is sized to allow collars to pass therethrough for positioning within loading zone 148. In addition, transport device 116 feeds collars towards collar loading assembly 112 in a direction of travel 156. Second plate 152 is positioned to intersect direction of travel 156 such that the collars are retained within loading zone 148.

Collar capture receptacle 146 further includes a retainer device 158 extending over collar feed opening 154. Retainer device 158 opens and closes for selectively restricting access to loading zone 148. As such, as will be explained in more detail below, retainer device 158 is operable for allowing only one collar to pass through collar feed opening 154 for positioning within loading zone 148 at a time. Retainer device 158 may be actuated and controlled by controller 118. Alternatively, in the exemplary implementation, retainer device 158 is embodied as a retainer clip that opens in response to an opening force induced by holding member 136 when in the loading position, and closes when the opening force is removed.

As described above, collar capture receptacle 146 receives the collar from collar feed assembly 104 (shown in FIG. 1) and holds the collar within loading zone 148. In one implementation, transport device 116 extends at least partially along robotic arm 108 (shown in FIG. 1) and couples to first plate 150 at collar feed opening 154. In the exemplary implementation, transport device 116 is embodied as a hollow feed tube 160 that channels collars from container 114 (shown in FIG. 1) towards collar loading assembly 112. More specifically, the collars are held within container 114 and channeled towards collar loading assembly 112 via pneumatic actuation. Alternatively, transport device 116 is any mechanism or structure capable of transporting an object from one location to another. For example, transport device 116 may be embodied as a conveyor-type device.

Figure 3:
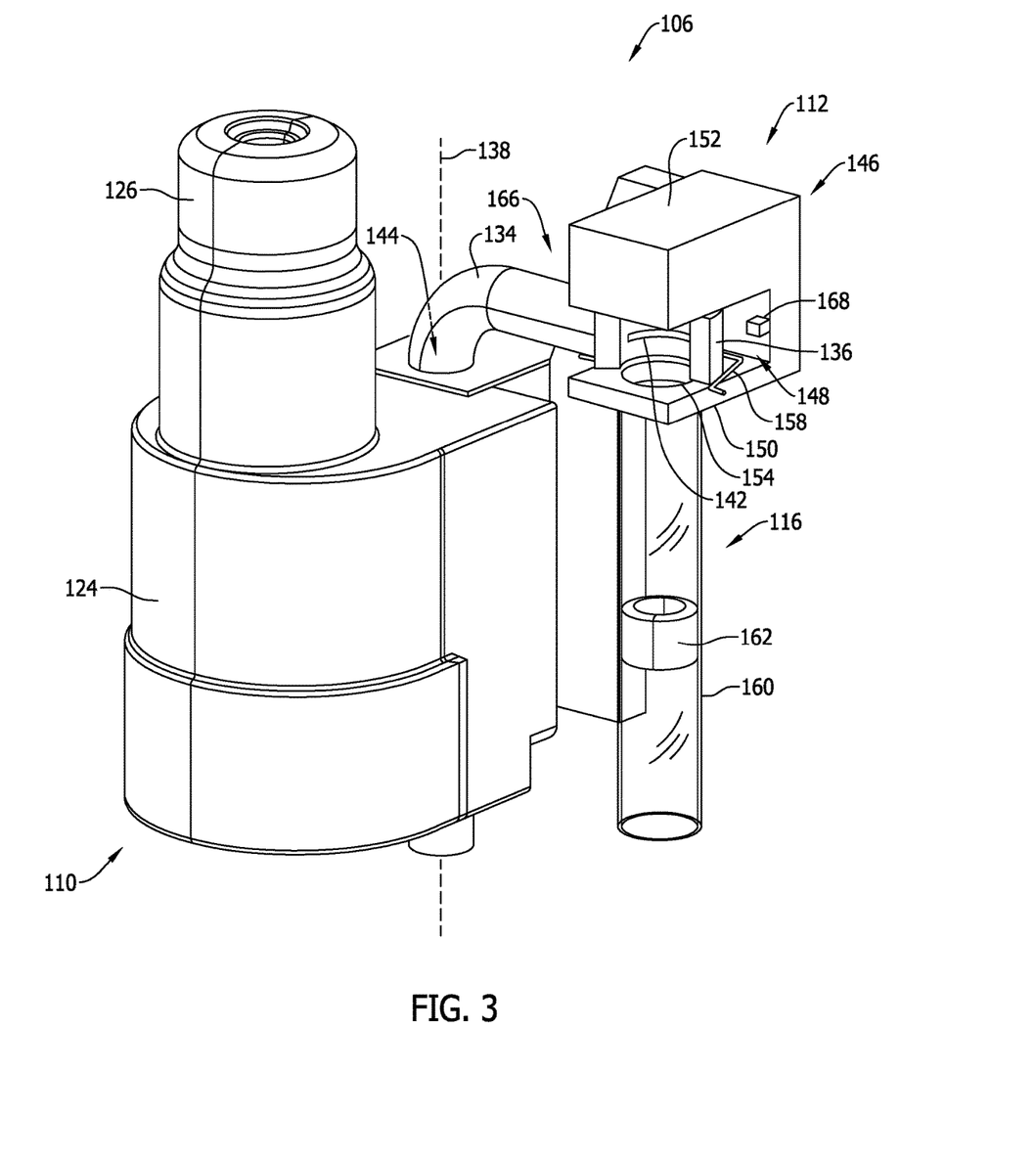
FIGS. 3-7 illustrate a sequence of process steps for installing a collar on a fastener.

FIGS. 3-7 illustrate a sequence of process steps for installing a collar 162 on a fastener 164. Referring to FIG. 3, loading arm 134 positions holding member 136 into a loading position 166 within loading zone 148. More specifically, loading arm 134 at least partially inserts holding member 136 into retainer device 158 for opening retainer device. In addition, as described above, holding member 136 receives collar 162 when at loading position 166. In one implementation, a proximity sensor 168 is coupled to collar capture receptacle 146 and is coupled in communication with controller 118 (shown in FIG. 1). Proximity sensor 168 determines when holding member 136 is positioned at loading position 166 within loading zone 148, and provides a signal to controller 118. Upon receiving the signal, controller 118 controls operation of collar feed assembly 104 (shown in FIG. 1) for feeding collar 162 towards collar loading assembly 112.

Figure 4:
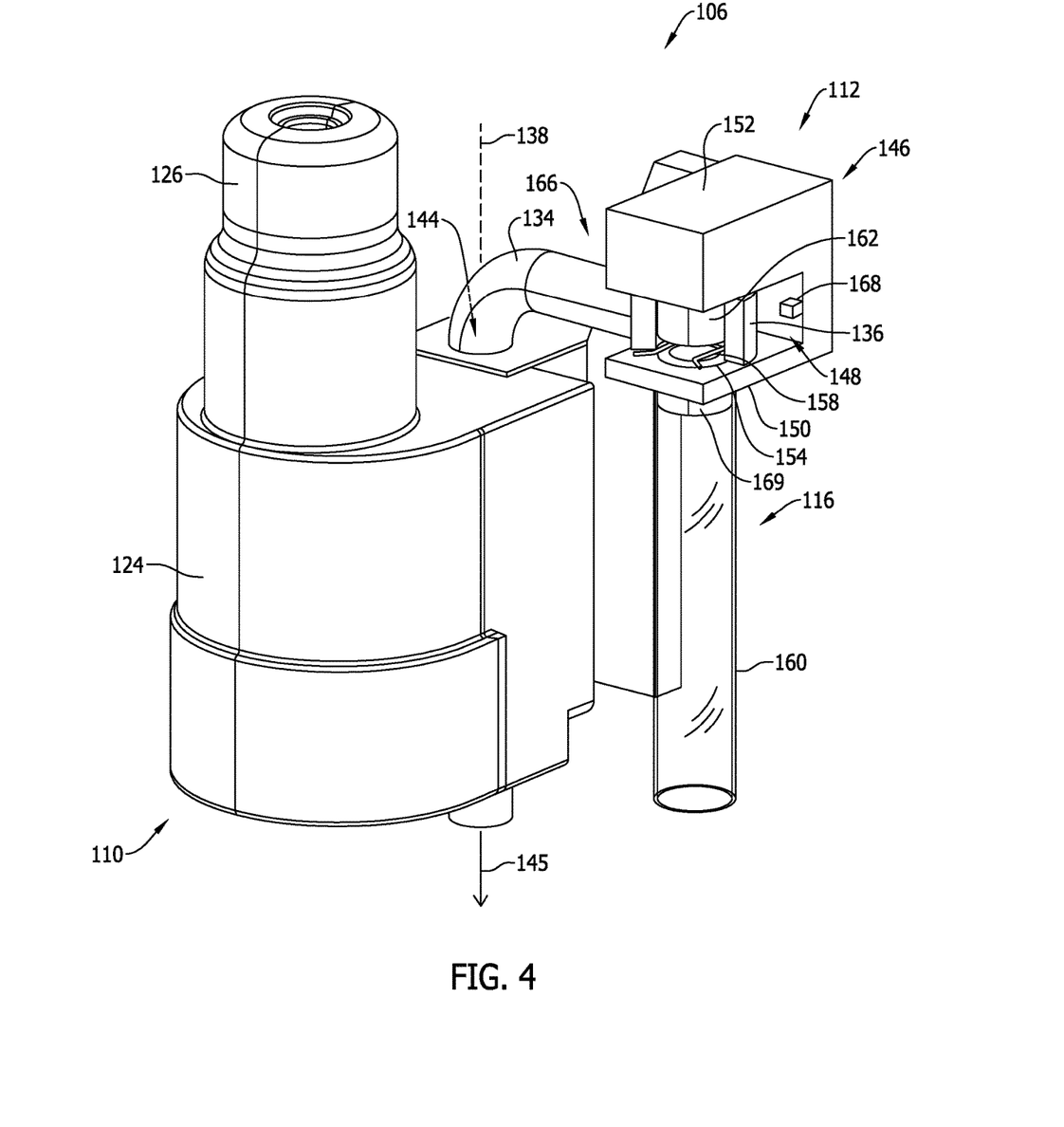

Referring to FIG. 4, collar 162 is received and held within loading zone 148 when positioned against second plate 152. Air 145 is then drawn through vacuum channel 144 for providing the retaining force at holding member 136, and coupling collar 162 to holding member 136. Loading arm 134 then translates axially relative to axis 138 such that holding member 136 is no longer coupled to retainer device 158. As such, retainer device 158 closes, and restricts access of an additional collar 169 to loading zone 148.

Figure 5:
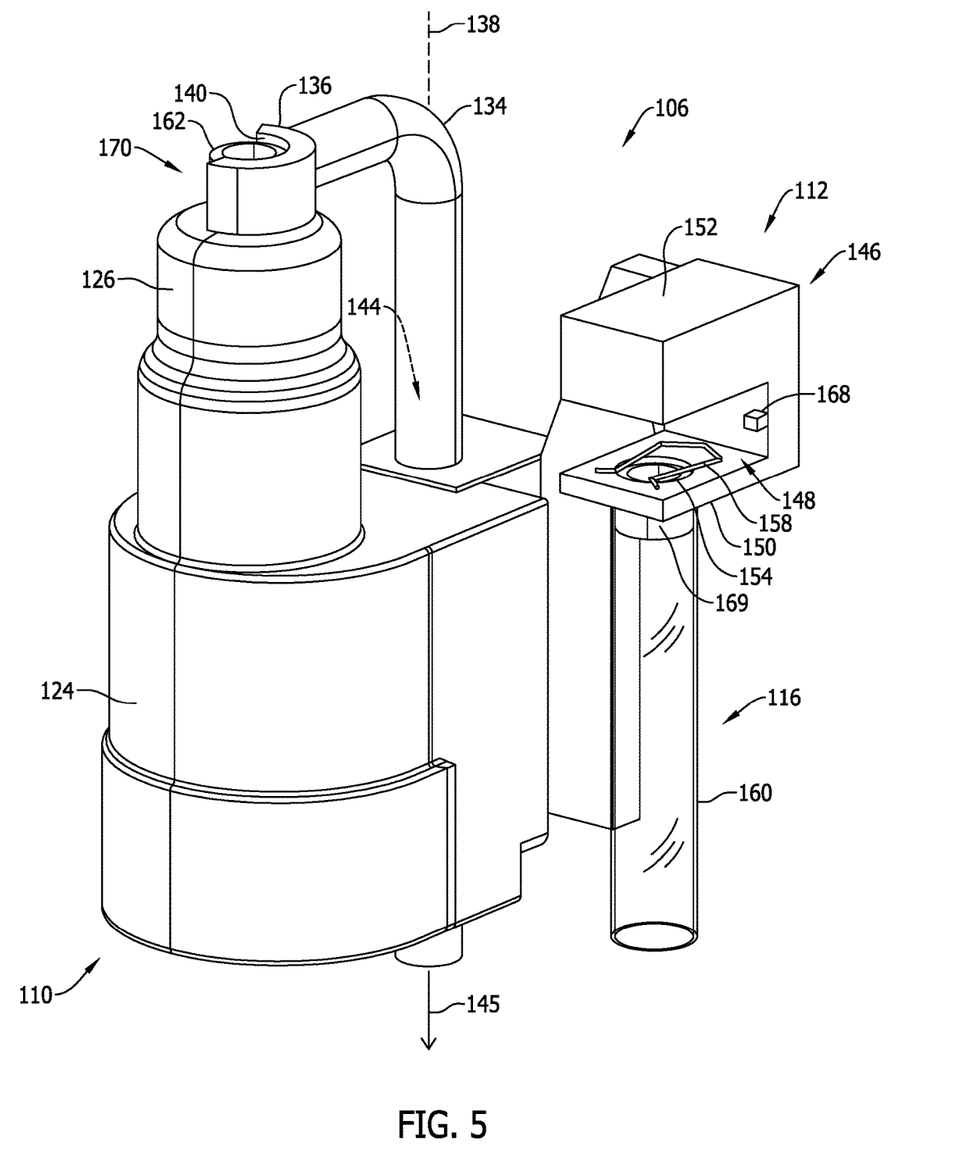

Referring to FIG. 5, loading arm 134 rotates and translates relative to axis 138 for positioning holding member 136 from loading position 166 into an unloading position 170. Unloading position 170 is generally located at fastener opening 128 of nose portion 126. Once holding member 136 is positioned at unloading position 170, the retaining force is released and collar 162 is seated within fastener opening 128. In an alternative implementation, a vacuum device (not shown) is coupled to nose portion 126 for retaining collar 162 in position for installation on a fastener.

Figure 6:
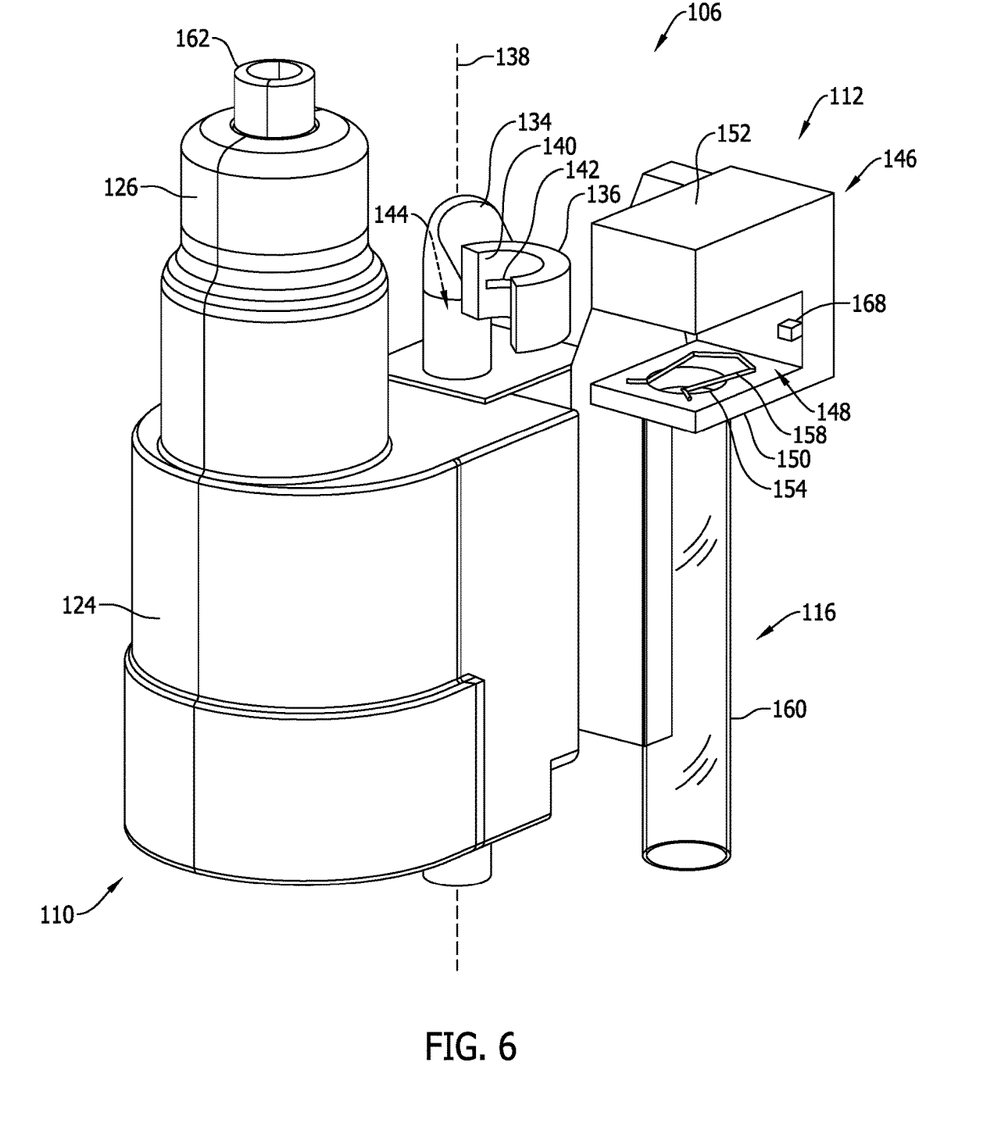
Figure 7:
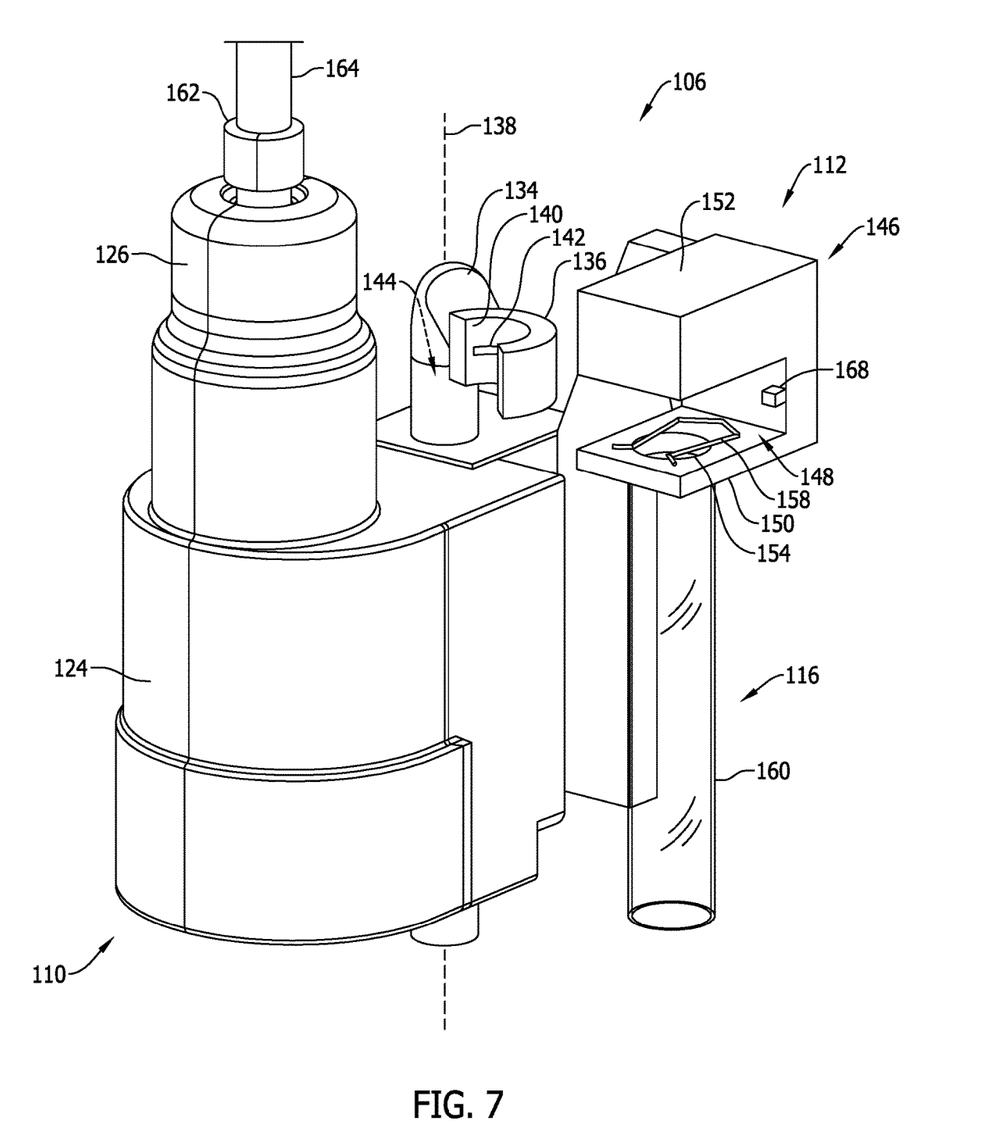

Referring to FIG. 6, loading arm 134 rotates and translates relative to axis 138 for returning holding member 136 to loading zone 148 for receiving additional collars. Referring to FIG. 7, robotic arm 108 aligns and positions end effector 106 (each shown in FIG. 1) for installing collar 162 on fastener 164.

Figure 8:
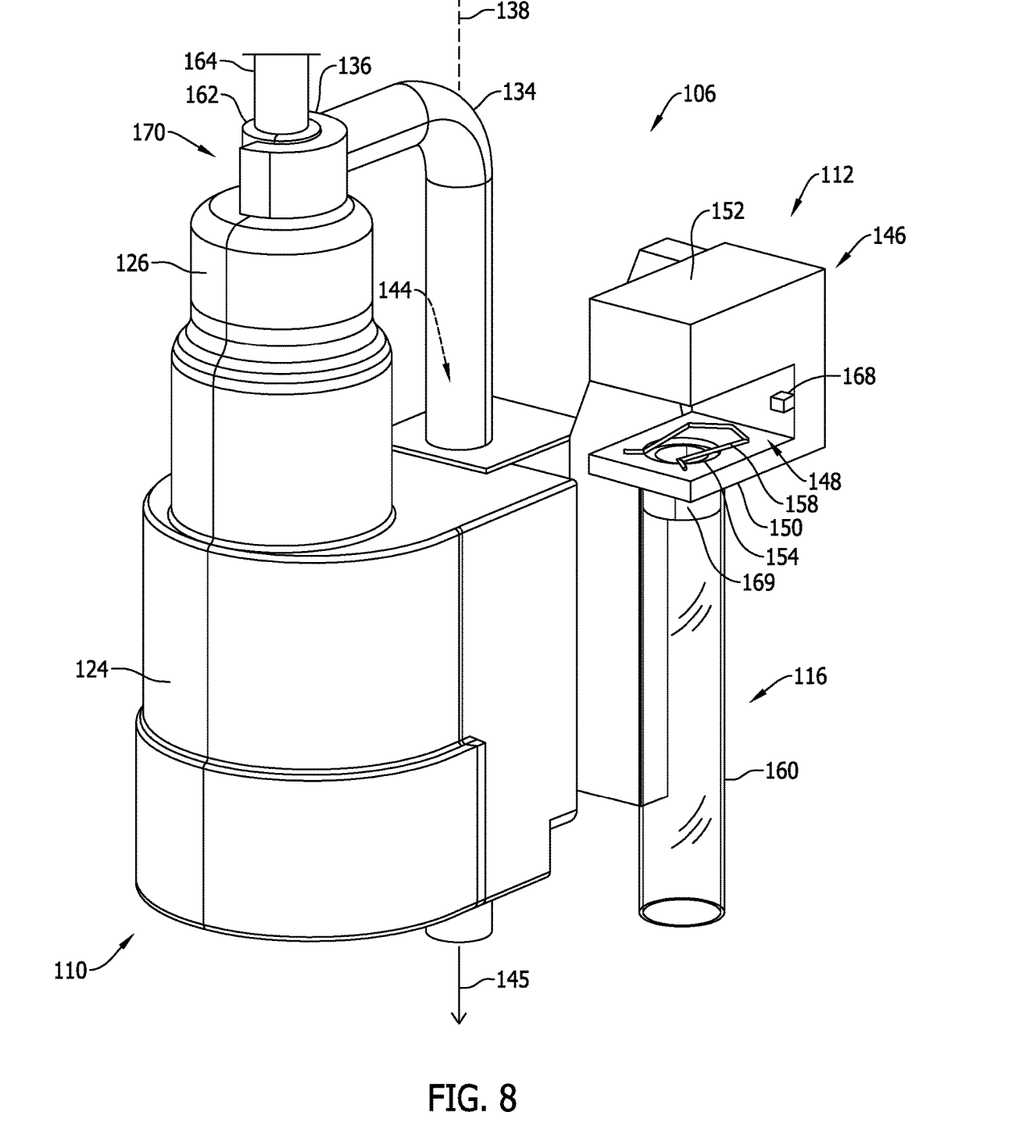
FIG. 8 illustrates an alternative final step for installing a collar on a fastener.

FIG. 8 illustrates an alternative final step for installing collar 162 on fastener 164. In the exemplary implementation, loading arm 134 rotates and translates relative to axis 138 for positioning holding member 136 from loading position 166 into unloading position 170, and holding member 136 continues to hold collar 162 while installed on fastener 164. Loading arm 134 then rotates and translates relative to axis 138 for returning holding member 136 to loading zone 148 for receiving additional collars.

A method of operating collar fastening system 100 including collar fastening tool 110 is also described herein. The method includes feeding collar 162 towards loading zone 148 defined within collar capture receptacle 146, and positioning holding member into loading position 166 within loading zone 148. Holding member is configured to receive collar 162 when at loading position 166. The method further includes holding collar 162 with holding member 136 with a retaining force, and positioning holding member 136 from loading position 166 into unloading position 170. Holding member 136 is configured to provide collar 162 to collar fastening tool 110 when at unloading position 170.

In one implementation, holding collar 162 with holding member 136 includes releasing the retaining force when holding member 136 is at unloading position 170. Alternatively, the method includes holding collar 162 at unloading position 170 as collar fastening tool 110 installs collar 162 over fastener 164. Holding collar 162 with holding member 136 includes drawing a vacuum at holding member 136, and the vacuum forms the retaining force.

In one implementation, feeding collar 162 includes feeding collar 162 from container 114 configured to hold a plurality of collars. In addition, the method includes positioning holding member 136 from unloading position 170 into loading position 166 for receiving an additional collar.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A collar fastening system comprising:
    a collar fastening tool comprising a body portion; and
    a collar loading assembly coupled to said collar fastening tool, said collar loading assembly comprising:
        an elongated channel coupled to the body portion and extending along an axis;
        a loading arm extending from the elongated channel; and
        a holding member coupled to said loading arm, wherein said loading arm is rotatable about the axis for positioning said holding member between a loading position and an unloading position, said holding member comprising an arcuate side wall and a vacuum opening defined in said arcuate side wall, said holding member configured to receive a collar when at the loading position, and configured to selectively hold the collar against said arcuate side wall with a retaining force provided by a vacuum applied via said vacuum opening, and
        wherein said loading arm is configured to provide the collar to said collar fastening tool when at the unloading position.

2. The system in accordance with claim 1, wherein said loading arm is configured to rotate to the unloading position to align the collar selectively held against said arcuate side wall with the collar fastening tool.

3. The system in accordance with claim 2, wherein said loading arm is at least partially hollow for defining a vacuum channel extending therethrough, said vacuum channel coupled in flow communication with said vacuum opening.

4. The system in accordance with claim 1 further comprising a collar feed assembly that comprises:
a container configured to hold a plurality of collars; and
a transport device extending between said container and said collar loading assembly, said transport device configured to feed the collar from said container towards said collar loading assembly.

5. The system in accordance with claim 4 further comprising a robotic arm coupled to said collar fastening tool, wherein said transport device extends at least partially along said robotic arm.

6. The system in accordance with claim 4, wherein said collar loading assembly further comprises a collar capture receptacle that defines a loading zone for the collar, said collar capture receptacle configured to receive the collar from said collar feed assembly and hold the collar at the loading zone.

7. The system in accordance with claim 6, wherein said collar capture receptacle comprises:
a first plate that comprises a collar feed opening defined therein, said collar feed opening sized to allow the collar to pass therethrough for positioning within the loading zone; and
a retainer device extending over said collar feed opening, said retainer device configured to open and close for selectively restricting access to the loading zone.

8. The system in accordance with claim 6, wherein said transport device is configured to feed the collar towards said collar loading assembly in a direction of travel, said collar capture receptacle comprising a second plate positioned to intersect the direction of travel.

9. A robotic device comprising:
an end effector comprising:
a collar fastening tool; and
a collar loading assembly coupled to said collar fastening tool, said collar loading assembly comprising:
a loading arm; and
a holding member coupled to said loading arm, wherein said loading arm is configured to position said holding member between a loading position and an unloading position, said holding member comprising a top edge, a bottom edge, an arcuate side wall extending therebetween, and a vacuum opening defined in said arcuate side wall, said holding member configured to receive a collar when at the loading position, and configured to selectively hold the collar against said arcuate side wall with a retaining force provided by a vacuum applied via said vacuum opening, and
wherein said loading arm is configured to provide the collar to said collar fastening tool when at the unloading position.

10. The device in accordance with claim 9, wherein said loading arm is configured to rotate to the unloading position to align the collar selectively held against said arcuate side wall with the collar fastening tool.

11. The device in accordance with claim 10, wherein said loading arm is at least partially hollow for defining a vacuum channel extending therethrough, said vacuum channel coupled in flow communication with said vacuum opening.

12. The device in accordance with claim 9, wherein said collar loading assembly further comprises a collar capture receptacle that defines a loading zone for the collar, said collar capture receptacle configured to receive and hold the collar at the loading zone.

13. The device in accordance with claim 12, wherein said collar capture receptacle comprises a first plate and a second plate spaced from each other by a distance such that the loading zone is defined therebetween.

14. The device in accordance with claim 13, wherein said first plate comprises a collar feed opening defined therein, said collar capture receptacle further comprising a retainer device extending over said collar feed opening, said retainer device configured to open and close for selectively restricting access to the loading zone.

15. A method of operating a collar fastening system including a collar fastening tool, said method comprising:
feeding, from a container configured to hold a plurality of collars, a collar towards a loading zone defined within a collar capture receptacle;
positioning, with a loading arm, a holding member into a loading position within the loading zone, wherein the holding member includes an arcuate side wall configured to receive the collar when at the loading position;
holding the collar against the arcuate side wall of the holding member with a retaining force provided by a vacuum applied via a vacuum opening defined in the arcuate side wall; and
positioning, with the loading arm, the holding member from the loading position into an unloading position, wherein the holding member is configured to provide the collar to the collar fastening tool when at the unloading position.

16. The method in accordance with claim 15, wherein holding the collar with the holding member comprises releasing the retaining force when the holding member is at the unloading position.

17. The method in accordance with claim 15 further comprising holding the collar at the unloading position as the collar fastening tool installs the collar over a fastener.

18. The method in accordance with claim 15, wherein holding the collar with the holding member comprises drawing a vacuum at the vacuum opening in the arcuate side wall.

19. The method in accordance with claim 15 further comprising positioning the holding member from the unloading position into the loading position for receiving an additional collar.

20. The device in accordance with claim 9, wherein said holding member is configured to release the collar provided to said collar fastening tool, and then return to the loading position.

* * * * *